June 7, 1927.
E. T. FERNGREN
1,631,804
METHOD AND APPARATUS FOR PRODUCING SHEET GLASS
Filed Aug. 21, 1922
3 Sheets-Sheet 1
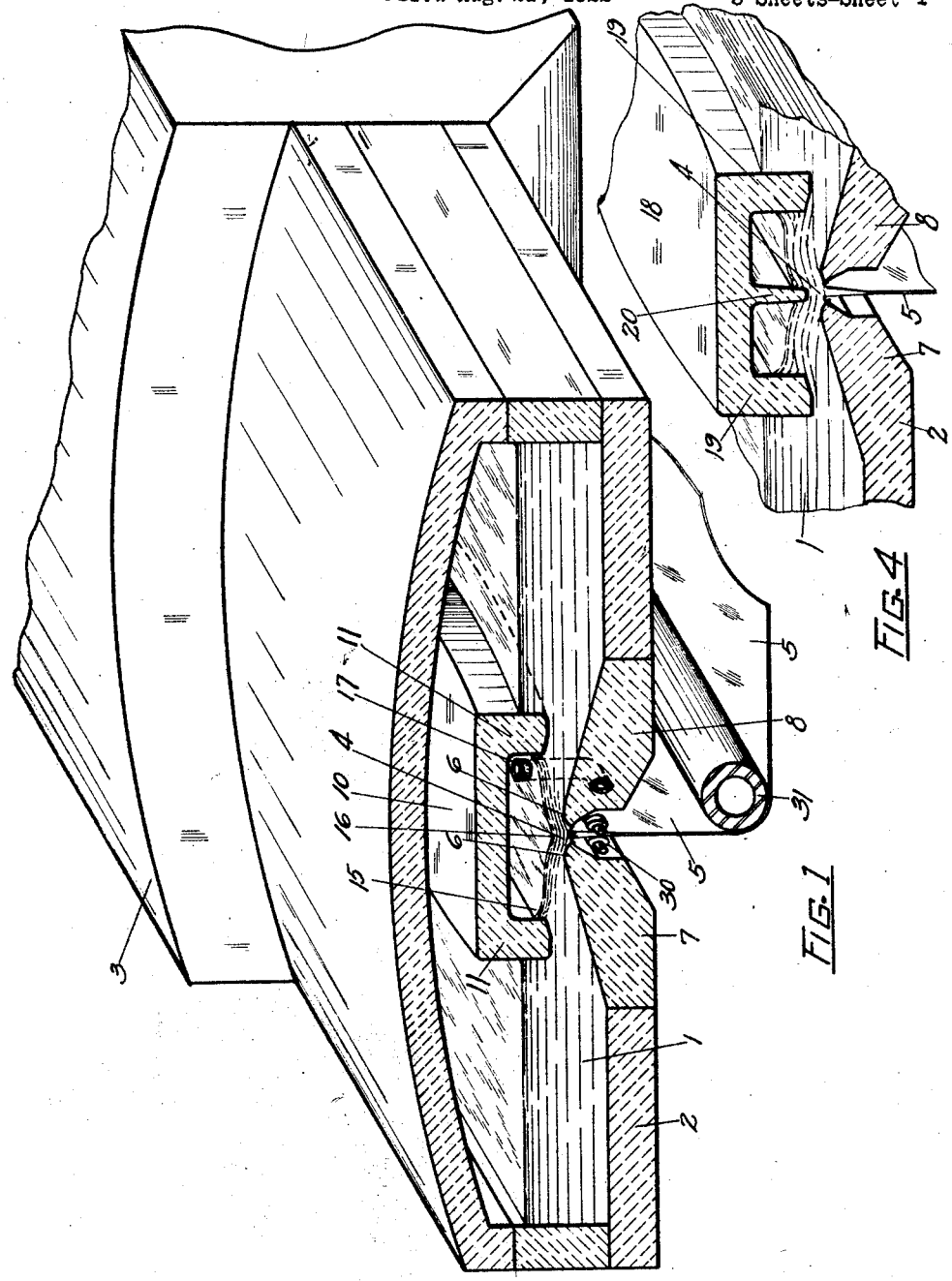
INVENTOR
Enoch T. Ferngren
BY C. A. Rowley
ATTORNEY June 7, 1927.
E. T. FERNGREN
1,631,804
METHOD AND APPARATUS FOR PRODUCING SHEET GLASS
Filed Aug. 21, 1922   3 Sheets-Sheet 2
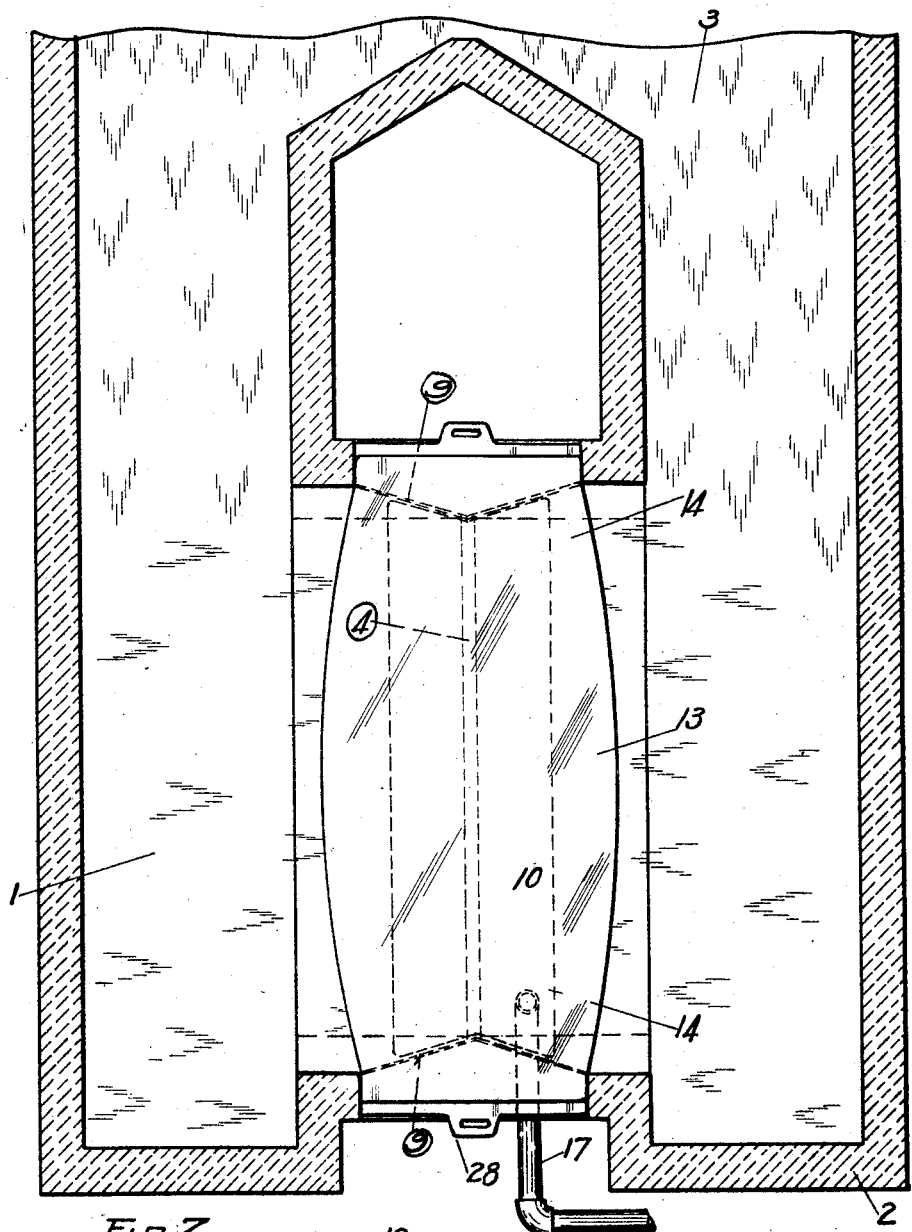
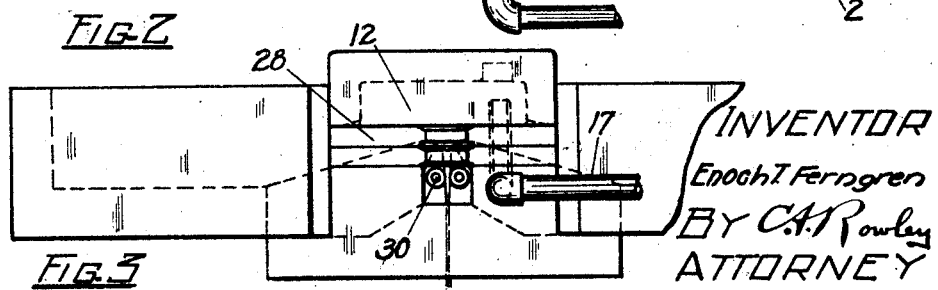
INVENTOR
Enoch T Ferngren
By C.A.Rowley
ATTORNEY

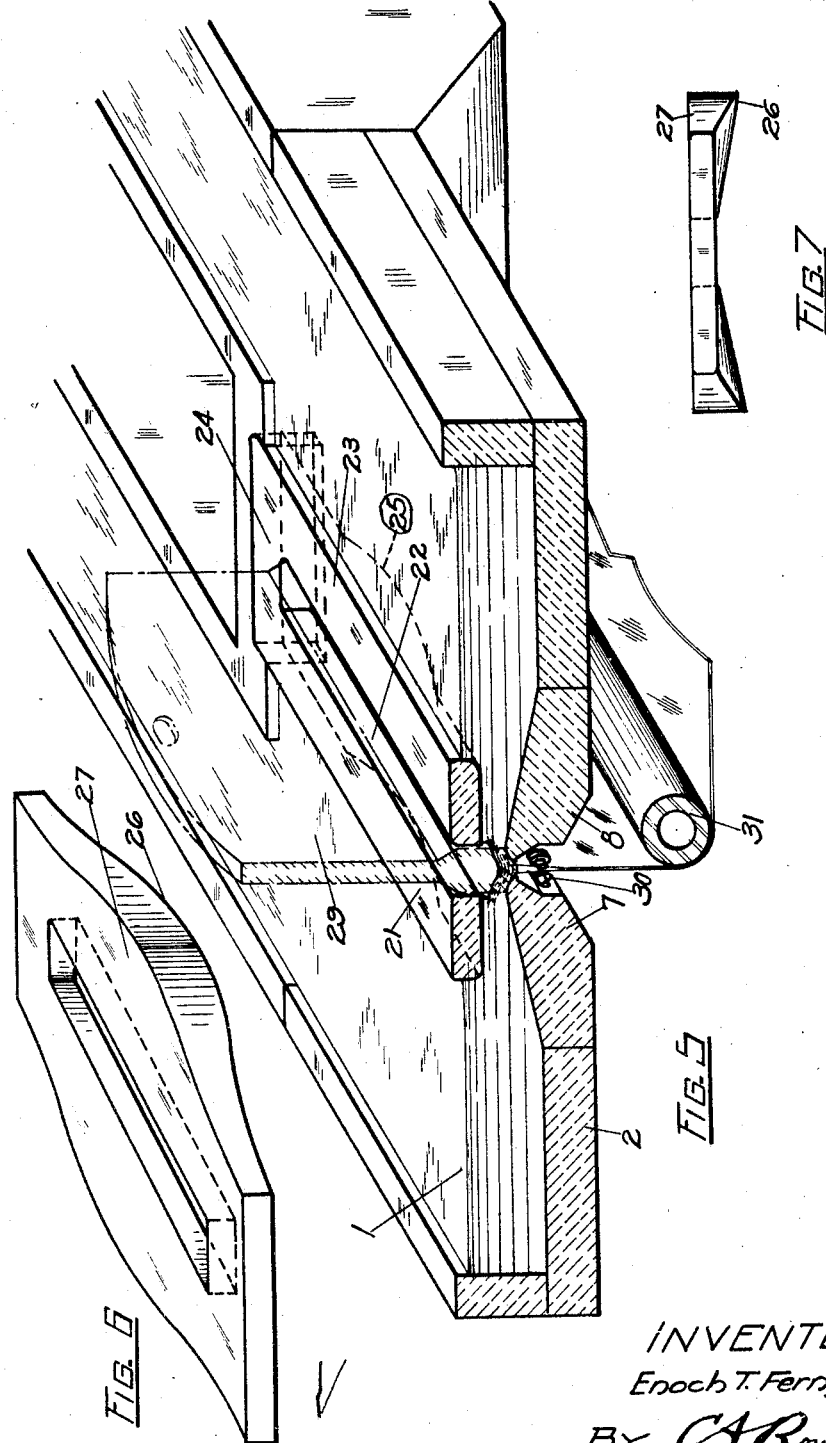

Patented June 7, 1927.

1,631,804

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

METHOD AND APPARATUS FOR PRODUCING SHEET GLASS.

Application filed August 21, 1922. Serial No. 583,346.

This invention relates to the art of producing sheet glass, and more particularly to an improved method and apparatus for drawing a sheet of glass downwardly through a slot or orifice in the bottom of a receptacle containing the supply of molten glass.

The invention embodies a method and means for regulating the flow of molten glass to the slot; for decreasing the glass contacting surfaces of the refractory members adjacent the overflow passages at the slot; and for creating a live tensional resistance in the surface glass above the slot, to resist the drawing action and support the sheet from above, independently of the overflow surfaces at the slot sides.

Other objects and advantages of the invention will be apparent from the following detailed description of certain forms of apparatus adapted to carry out the principles of the invention.

In the accompanying drawings:

Fig. 1 is a perspective view, partly in vertical transverse section, of the preferred form of the apparatus.

Fig. 2 is a plan view of the structure shown in Fig. 1, with the roof removed.

Fig. 3 is an end view of the parts shown in Fig. 2.

Fig. 4 is a partial section similar to Fig. 1, showing a somewhat modified form of sheet-supporting and flow-regulating member.

Fig. 5 is a view similar to Fig. 1, of a modified form of apparatus, the cover portions or roof for the receptacle and tank being removed.

Fig. 6 is a perspective view of a form of flow-regulating member, and

Fig. 7 is an end view of this member.

Referring first to Figs. 1, 2 and 3, the supply of molten glass 1 in receptacle 2 is in open communication with a continuous tank furnace 3 or other suitable source of molten glass, whereby the supply of molten glass 1 may be continually replenished.

The bottom of receptacle 2 has a slot or orifice at 4, through which the molten glass may escape or be drawn away in sheet form as indicated at 5. The slot or orifice 4 is formed between the upwardly projecting lip portions 6 of the two refractory tiles 7 and 8. It should be noted that the highest points of the two upwardly slanting ridge portions of the tiles curve over into the slot so as to give a minimum of frictional and clinging surface to the molten glass as it flows or is drawn into the sheet. The upwardly slanting tiles also provide a much shallower overflow passage for the glass at either side of the slot, thus accelerating the rate of flow at this point, so that the glass will not linger in contact with the lips 6, and freeze or adhere thereto. The side walls of these passages are tapered in as at 9 (Fig. 2) to direct the flow of glass to the slot, and prevent stagnation near the ends thereof.

An inverted cap or closure member 10 of refractory material is mounted above, and straddling, the slot 4, with its downwardly extending side walls 11 and end walls 12 projecting into the pool of molten glass 1. It will be noted that the side walls 11 are thicker at their central portions 13 than at the ends 14. The greater bulk or cross-section at the center offers a greater resistance to the flow of the molten glass. As the flow will ordinarily be freer and faster at the center than at the ends, this added resistance or obstacle to the flow at the center tends to equalize the flow throughout the length of the slot. Different variations of form are given to these flow resisting members in Figs. 5, 6 and 7; the walls being curved downwardly at their centers in Fig. 5, and being thicker in both height and breadth in Figs. 6 and 7. The object in any case is to offer a greater resistance to the flow of the glass at the center, either by impeding its progress by narrowing the passage, or by offering a greater surface of refractory material to which the glass will tend to cling. By equalizing the flow throughout the length of the slot, the sheet will be drawn off evenly and will not tend to run ahead at the center, under the influence of gravity.

The walls 11 and 12 of the closure member 10, partially cut off or isolate the body of molten glass above the slot 4 from the main body of glass 1. The glass thus partly shut off from the main body will have its level lowered as the sheet of glass is drawn therefrom. A partial vacuum will be thus formed above this glass so that the air pressure acting up through the slot 4 from below will tend to support the sheet source, and relieve the supporting strain on the lips 6. At the same time there will be a movement of glass from outside the closure member 10, under the side walls 11, to replace the glass being pulled down through the slot 4. The upwardly pushing inflowing glass will tend to raise the glass level within the member 10 near the side-walls 11 as at 15, while the outflowing glass tends to lower the level at the center 16. As these actions are in opposition to one another, the surface of the enclosed molten glass is constantly being tensioned more than normal. This will create a live tractive force tending to resist the drawing action and support the sheet source.

To aid in the above actions, the air may be partially exhausted from the space above the enclosed glass to increase the vacuum. For this purpose a pipe 17 is indicated in Fig. 1, projecting in through the molten glass which acts as a seal. This pipe may be connected with any suitable air-exhausting apparatus.

In the modification shown in Fig. 4, the closure member 18 has, in addition to the side walls 19, a central downwardly projecting wall or flange 20. This projects into the molten glass directly above the sheet source, and the adherence of the glass thereto serves as an additional supporting means for the sheet 5.

In the modification shown in Fig. 5, the sheet-supporting and flow-resisting member 21 differs from the members 10 and 18 already described, in having the central opening 22 open at the top. The side walls 23 are similar to a pair of floaters joined at their ends as at 24. The action of this form of the apparatus is much the same as the forms already described, except the vacuum feature is absent. The float will act as a resistor to the drawing action, first by reason of the large glass engaging and clinging surface which acts as a drag on the glass flowing toward the orifice, and second by reason of the surface tension on the glass within the central opening 22 of the float.

As already mentioned, this member 21 may have its side walls deeper at the middle as shown at 25, (Fig. 5), or these walls may be both deeper as shown at 26 and wider as shown at 27, Figs. 6 and 7. In any case these thicker portions act as a greater drag on the glass at these points and tend to equalize the flow of molten glass to all parts of the orifice or slot 4.

The position or height of the members 10, 18 or 21, within the molten glass may be regulated or adjusted by inserting or removing shims 28, on which the member rests at its ends. In order to entirely cut off the flow of glass to the slot or orifice when it is desired to discontinue the sheet-drawing operation, the members 10 or 18 may be lowered into contact with the bottom tiles 7 and 8 of the containing receptacle 2. In Fig. 5, a cut-off gate 29 is indicated in dotted lines. This gate may be lowered through the opening 22 in member 21, to close the slot 4 when the sheet drawing operation is to be discontinued. When not in use, the gate 29 is elevated out of the opening 22.

Edge-cooling rollers, such as indicated at 30, may be used at the edges of the sheet, and such other sheet guiding or temperature regulating mechanisms as may be found necessary may be added. As illustrated, the sheet 5 is drawn down around a cooled bending roller 31, and carried away in the horizontal plane, but it is to be understood that the sheet may be drawn away, flattened, annealed, and severed into sections either in the vertical or horizontal planes, and by any suitable mechanism for these purposes.

It will be noted that with an apparatus of this type, the glass sheet will be under a constant retractive stress while being drawn downwardly through the slot or orifice, which stress or supporting force relieves the lips at the edges of the slot of a large part of the drawing stress, so that the glass may be maintained hotter and more fluid where it passes over the lips and have less tendency to stick thereto and form lines or other blemishes in the sheet surfaces. The drawing tension is confined largely to the interior portions of the sheet, the surface portions being formed by more of a flowing action. These surfaces shrink onto the cooler more tenacious interior, forming smooth flat surfaces.

Claims:

1. In the method of producing sheet glass by moving the glass downwardly through an orifice in the molten-glass container, that step wherein the surface portion of the molten glass directly overlying the orifice is isolated from the main body of glass and an increased surface tension is created in this isolated section, by providing spaced clinging surfaces to which the edges of the isolated body of glass may adhere.

2. In the method of producing sheet glass by moving the glass downwardly through an orifice in the molten-glass container, that step wherein the surface portion of the molten glass directly overlying the orifice is isolated from the main body of glass and an increased surface tension is created in this isolated section, by creating a partial vacuum thereabove.

3. The method of drawing a sheet of glass downwardly through an opening, which consists in isolating the surface of the glass in the opening and thereabove, from which the sheet is drawn, and keeping this glass under retractive stress during the drawing operation.

4. In an apparatus for producing sheet glass, a receptacle for the molten glass having a slotted orifice in its bottom, the bottom walls adjacent the slot sloping upwardly to provide shallow overflow passages to the slot.

5. In an apparatus for producing sheet glass, a receptacle for the molten glass having a slotted orifice in its bottom, the bottom walls adjacent the slot sloping upwardly and having rounded tapered upper edges, to provide shallow overflow passages to the slot, with small glass engaging surfaces.

6. In an apparatus for producing sheet glass, a receptacle for the molten glass having a slot or orifice in its bottom through which the glass is drawn to produce the sheet, and a pair of flow-restricting members projecting into the molten glass within the receptacle at either side of the orifice.

7. In an apparatus for producing sheet glass, a receptacle for the molten glass having a slot or orifice in its bottom through which the glass is drawn to produce the sheet, and a pair of flow-restricting members projecting into the molten glass within the receptacle at either side of the orifice, said members being so formed as to impede the flow more at the center of the orifice than adjacent the ends thereof.

8. In an apparatus for producing sheet glass, a receptacle for the molten glass having a slot or orifice in its bottom through which the glass is drawn to produce the sheet, and a pair of flow-restricting members projecting into the molten glass within the receptacle at either side of the orifice, said members having a greater flow-impeding cross-section at their center than at their ends.

9. In an apparatus for producing sheet glass, a receptacle for the molten glass having a slot or orifice in its bottom through which the glass is drawn to produce the sheet, and a pair of floaters projecting into the surface molten glass adjacent the slot sides, to regulate the flow to the orifice, and produce an increased surface tension above the orifice.

10. In an apparatus for producing sheet glass, a receptacle for the molten glass having a slot or orifice in its bottom through which the glass is drawn to produce the sheet, and an inverted cap-member whose sides project into the molten glass at the sides of the orifice, to form an enclosed suction chamber above the molten glass above the orifice.

11. In an apparatus for producing sheet glass, a receptacle for the molten glass having a slot or orifice in its bottom through which the glass is drawn to produce the sheet, and an inverted cap-member whose sides project into the molten glass at the sides of the orifice, to form an enclosed suction chamber above the molten glass above the orifice, and means for partially exhausting the air from the chamber.

12. In an apparatus for producing sheet glass, a receptacle for the molten glass provided with a slotted orifice in its bottom, the bottom walls adjacent the orifice extending upwardly to provide shallow overflow passages to the orifice, and glass movement controlling members projecting into the glass adjacent the orifice for equalizing the velocity of glass movement toward and along the extent of the orifice.

Signed at Toledo, in the county of Lucas, and State of Ohio, this 18th day of August, 1922.

ENOCH T. FERNGREN.